(12) United States Patent
Rogalski et al.

(10) Patent No.: US 6,976,059 B1
(45) Date of Patent: Dec. 13, 2005

(54) SYSTEM AND METHOD TO PROVIDE APPLETS USING A SERVER BASED VIRTUAL MACHINE

(75) Inventors: Mark Daniel Rogalski, Leander, TX (US); Allen Chester Wynn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 09/621,273

(22) Filed: Jul. 20, 2000

(51) Int. Cl.[7] .............................................. G06F 15/16
(52) U.S. Cl. ...................... 709/218; 717/115; 717/148
(58) Field of Search ................................ 707/201, 500; 709/203, 219, 232, 218; 345/846; 719/330; 717/100, 139

(56) References Cited

U.S. PATENT DOCUMENTS

| | | | |
|---|---|---|---|
| 5,802,530 A | 9/1998 | Van Hoff | 707/513 |
| 5,870,544 A | 2/1999 | Curtis | 395/187.01 |
| 5,901,315 A | 5/1999 | Edwards, et al. | 395/704 |
| 5,973,696 A | 10/1999 | Agranat, et al. | 345/357 |
| 5,974,441 A | 10/1999 | Rogers, et al. | 709/200 |
| 5,978,834 A | 11/1999 | Simonoff, et al. | 709/203 |
| 5,987,513 A | 11/1999 | Prithviraj, et al. | 709/223 |
| 5,992,752 A | 11/1999 | Wilz, Sr., et al. | 235/472.01 |
| 5,999,941 A | 12/1999 | Andersen | 707/103 |
| 6,006,242 A | 12/1999 | Poole et al. | 707/531 |
| 6,043,815 A | 3/2000 | Simonoff, et al. | 345/335 |
| 6,058,428 A * | 5/2000 | Wang et al. | 709/232 |
| 6,081,837 A * | 6/2000 | Stedman et al. | 709/219 |
| 6,125,402 A * | 9/2000 | Nagarajayya et al. | 719/330 |
| 6,272,673 B1 * | 8/2001 | Dale et al. | 717/100 |
| 6,298,356 B1 * | 10/2001 | Jawahar et al. | 707/201 |
| 6,313,835 B1 * | 11/2001 | Gever et al. | 345/846 |
| 6,446,111 B1 * | 9/2002 | Lowery | 709/203 |
| 6,463,460 B1 * | 10/2002 | Simonoff | 709/203 |
| 6,466,967 B2 * | 10/2002 | Landsman et al. | 709/203 |
| 6,609,150 B2 * | 8/2003 | Lee et al. | 709/219 |
| 6,738,803 B1 * | 5/2004 | Dodrill et al. | 709/218 |
| 2002/0019831 A1 * | 2/2002 | Wade | 707/500 |

OTHER PUBLICATIONS

Carminelli-Gregori, A.M., et al., "Intelligent Web Agents for Information Retrieval and Classification," International Conf. of Practical Appl. of Intelligent Agents, 4th, London, Apr. 19-21, 1999, p. 267-80.

(Continued)

*Primary Examiner*—Viet D. Vu
*Assistant Examiner*—Dustin Nguyen
(74) *Attorney, Agent, or Firm*—Van Leeuwen & Van Leeuwen; Joseph T. Van Leeuwen; Mark S. Walker (57) ABSTRACT

A system and method for delivering application data to both constrained and non-constrained devices. In a Java implementation, the Abstract Window Toolkit (AWT) is used when a client computer system is not constrained and is running the Java Virtual Machine. When the client computer is constrained and, therefore, is unable to execute the Java Virtual Machine, the server computer uses a second library called a Markup Language Window Toolkit (MLWT) with the same API names as in the AWT. The result of the Java Virtual Machine executing APIs from the AWT within a browser on the client computer system are graphics that appear on the client's browser display. Correspondingly, the result of a server executing a Java Virtual Machine executing APIs from the MLWT is HTML and/or JavaScript that is capable of being processed and displayed by a client computer system without using a Java Virtual Machine. The system and method further determines whether a client computer system is constrained resulting in the use of either the AWT or the MLWT.

24 Claims, 7 Drawing Sheets

OTHER PUBLICATIONS

Bhatia, D. et al., "WebFlow—a Visual Programming Paradigm for Web/Java Based Coarse Grain Distributed Computing," Concurrency: Practice and Experience, Conf. Proceedings, Syracuse, Dec. 16-17 1996, p. 555-77.

IBM Research Disclosure, "Client Application for Integrating a Development Environment with a Web Distributed Authoring Server," Apr. 1999, p. 578-79.

IBM Research Disclosure, "A System for Allowing Software Development Tools to Remotely Access an Integrated Development Environment," Oct. 1999, p. 1359-60.

Okada, I., et al., "Application Development Tools for Web Distribution Systems in HOLON/VP (V4.0)," NEC Technical Journal, vol. 51, No. 6, 1998, p. 103-108 (in Japanese w/English abstract).

Kennedy, R. et al., "Monitoring of Distributed Processes with Mobile Agents," IEEE Intl. Conf. on Engineering of Computer Based Systems, $7^{th}$, Edinburgh, Apr. 3-7, 2000, p. 201-210.

Gracanin, D. et al., "Virtual Reality Testbed for Mobile Robots," IEEE Intl. Symposium on Industrial Electronics, Bled, Slovenia, Jul. 12-16, 1999, p. 293-97.

Bathelt, M. et al., "Accessing embedded systems via WWW: the Pro Web toolset," Computer Networks and ISDN Systems, Intl. WWW Conf., 6th, Santa Clara, Apr. 7-11, 1997, p. 1065-73.

Salisbury, C. F. et al., "Web-based Simulation Visualization Using Java3D," Winter Simulation Conf., Phoenix, Dec. 5-8, 1999, p. 1425-29.

* cited by examiner

SYSTEM AND METHOD TO PROVIDE APPLETS USING A SERVER BASED VIRTUAL MACHINE

BACKGROUND OF THE INVENTION

1. Technical Field

The present invention relates in general to a method and system for delivering a common application to both a constrained and non-constrained device. More particularly, the present invention relates to an improved method and system for processing Internet applications (i.e., Java Applets).

2. Description of the Related Art

Computer systems in general and International Business Machines (IBM) compatible personal computer systems in particular have attained widespread use for providing computer power to many segments of today's modern society. Systems with microprocessors are finding themselves in an array of smaller and more specialized objects that previously were largely untouched by computer technology. These devices are sometimes called "pervasive computing systems" because of their appearance as both traditionally computerized devices, such as desktop computers, tower computers, and portable computers, as well as newly computerized devices such as telephones, appliances, automobiles, and other devices. Pervasive computing devices often include a system processor and associated volatile and non-volatile memory, a display area, input means, and often interfaces, such as a network interface or modem, to other computing devices.

One of the distinguishing characteristics of these systems is the use of a system board to electrically connect these components together. These pervasive computing devices are information handling systems which are designed primarily to give independent computing power to a single user, or a group of users in the case of networked pervasive computing devices. Pervasive computing devices are often inexpensively priced for purchase by individuals or businesses. A pervasive computing device may also include one or more I/O devices (i.e. peripheral devices) which are coupled to the system processor and which perform specialized functions. Examples of I/O devices include modems, sound and video devices or specialized communication devices. Nonvolatile storage devices such as hard disks, CD-ROM drives and magneto-optical drives are also considered to be peripheral devices. Pervasive computing devices are often linked to computing systems and other pervasive computing devices using a network, such as a local area network (LAN), wide area network (WAN), or other type of network such as the Internet. By linking to computers including pervasive computing devices, a pervasive computing device can use resources owned by another computing device. These resources can include files stored on nonvolatile storage devices and resources such as printers.

Servers provide information to client computers, such as pervasive computing devices, that link to the servers through the network. Because a server serves a wide variety of clients, the processing abilities and power of the client computers requesting information is often unknown by the server. One type of information provided by servers is an applet. An applet is a program written in the Java™ programming language that can be included in an HTML page, much in the same way an image is included. When a Java technology-enabled browser is used view a page that contains an applet, the applet's code is transferred to the client's computer system and executed by the browser's Java Virtual Machine (JVM) running in the client computer system. Java applets are more capable and dynamic than many other types of network (Internet) based applications.

A challenge, however, is providing applet functionality to the wide variety of devices that request information from a server. While a typical desktop computer system may be able to execute a JVM in its browser, other more constrained pervasive computing devices cannot run a JVM and are therefore unable to view content that is delivered as part of an applet. For example, a cellular telephone may be a pervasive computing device with a link (i.e., wireless modem connection) to the Internet and a display screen capable of displaying web pages delivered from the Internet. However, because of its small size, smaller computing power, and smaller power source (rechargeable battery), the cellular telephone pervasive computing device may lack the power to run the Java Virtual Machine in is basic browser. In addition, the wireless modem connection may be slower than a broadband Internet connection further inhibiting the cell phone's ability to download Java applets.

Content providers that wish to serve both non-constrained client computers and more constrained pervasive computing devices traditionally provide both an applet and a servlet. A servlet is a Java application that runs on a server in order to produce content (i.e., HTML) to be sent to a client computer. If the client is capable of running the applet, the applet is loaded into the client's computer system and run by the Java Virtual Machine running in the client's computer. If the client is not capable of running the applet, the servlet is executed by the server and the contents are delivered and displayed on the client computer. A challenge with the current art, therefore, is that two programs (i.e., an applet and a servlet) are needed to support constrained and non-constrained clients.

What is needed, therefore, is a method for running the same applet on either the server or the client depending on the constraints existing within the client computer system.

SUMMARY

It has been discovered that providing a markup language windowing toolkit (MLWT) allows an applet to execute on either the server computer system or on the client computer system. If a client computer system is unable to execute an applet, the applet is run by the server computer in the server's Java Virtual Machine using the MLWT rather than Java's standard abstract windowing toolkit (AWT) to create hypertext markup language (HTML) and/or JavaScript that can be viewed by the client computer without using a Java Virtual Machine. On the other hand, if the client computer is capable of executing the applet, the applet is delivered to the client computer system and executed by the client's Java Virtual Machine using the AWT. In this manner, the same program is used both as a servlet and an applet without needing two separate application programs.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
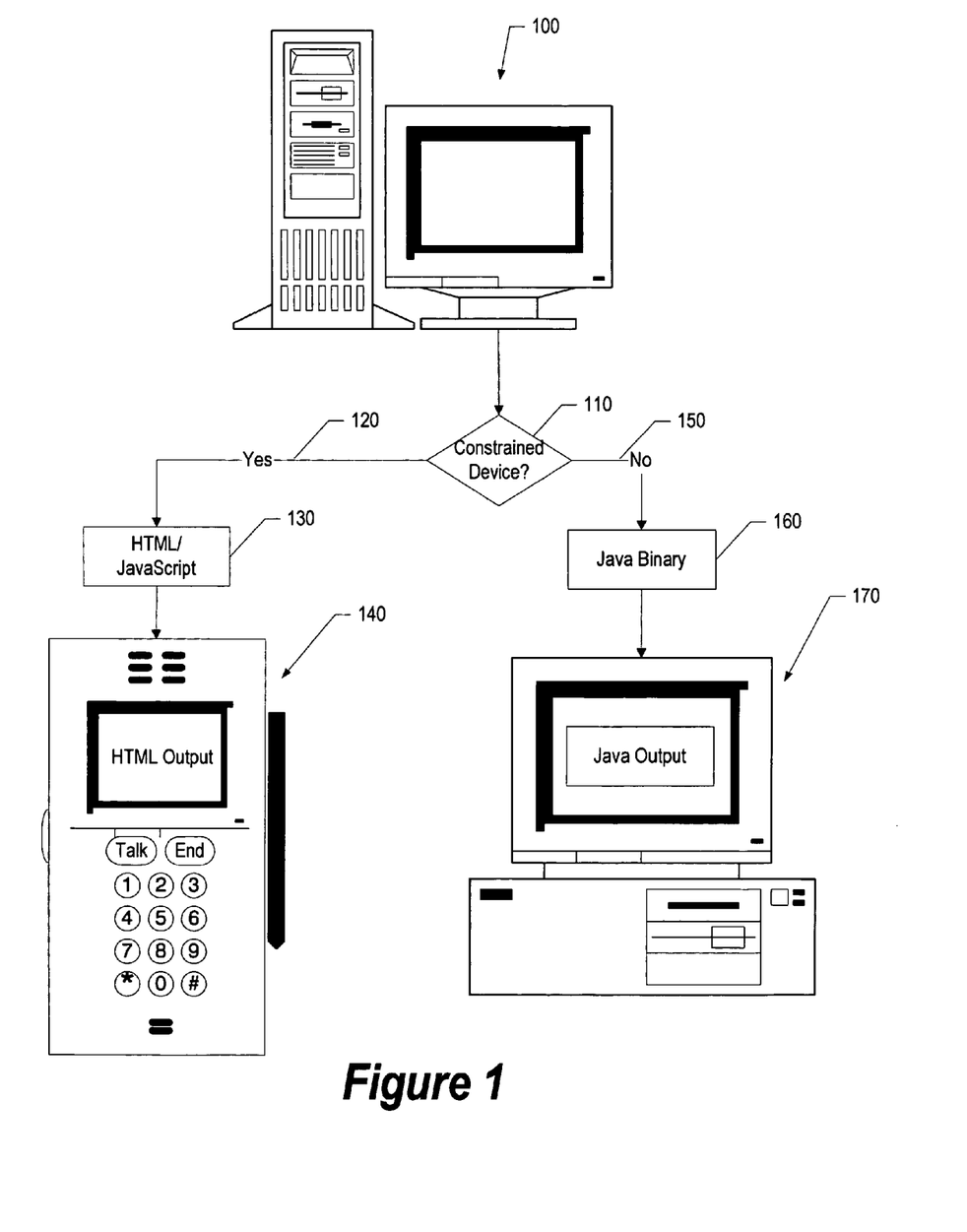
FIG. 1 is a block diagram of a server computer providing display code to a constrained and non-constrained device.

FIG. 1 shows server computer 100 providing graphic data to pervasive computing device 140 and desktop computer system 170. Decision 110 determines whether the target device is constrained. In the case of pervasive computing device 140, the device is constrained because of the lower computing power of the device. In the example shown, pervasive computing device 140 is a cellular telephone with a wireless Internet connection to connect to server 100. Because pervasive computing device 140 is constrained, decision 110 branches to "yes" branch 120 and HTML/JavaScript 130 is delivered to the constrained pervasive computing device. Pervasive computing device 140 is capable of displaying graphics provided in HTML/JavaScript 130 because the Java Virtual Machine (JVM) is not required to display HTML/JavaScript. HTML stands for Hypertext Markup Language, an authoring language used to create documents on the World Wide Web (or "web"). HTML defines the structure and layout of a Web document by using a variety of tags and attributes. The correct structure for an HTML document starts with <HTML><HEAD> (enter here what document is about) </HEAD><BODY> and ends with </BODY></HTML>. All the information you'd like to include in your Web page fits in between the <BODY> and </BODY> tags. There are hundreds of other tags used to format and layout the information in a Web page. For instance, <P> is used to make paragraphs and <I> . . . </I> is used to italicize fonts. Tags are also used to specify hypertext links. These allow Web developers to direct users to other Web pages with only a click of the mouse on either an image or word(s). JavaScript is a scripting language that allows authors to design interactive web sites. A scripting language is a simple programming language allowing authors to use lists of commands that can be executed without user interaction. Although JavaScript shares many features and structures of the full Java programming language, it does not require the Java Virtual Machine in order to execute. JavaScript can interact with HTML source code allowing authors to add dynamic content to web sites.

On the other hand, if the client computer system is not a constrained device, decision 110 branches to "no" branch 150 whereupon Java binary code 160 comprising the applet is sent to desktop computer system 170. Once delivered to desktop computer system 170, Java binary code 160 is executed by a Java Virtual Machine using the Abstract Windowing Toolkit running on the desktop computer system within a browser window on the desktop computer. Examples of browsers include Netscape Navigator™ and Microsoft Internet Explorer™. The Abstract Windowing Toolkit (AWT) is a Java™ application programming interface (API) that enables programmers to develop Java applications with graphical user interface (GUI) components such as windows, buttons, and scroll bars. The Java Virtual Machine (JVM or VM) is responsible for translating the AWT calls into the appropriate calls to the operating system running on the client's desktop computer system. Ideally, the AWT should allow any Java application to appear the same whether it is being run on a Microsoft Windows, Macintosh, or UNIX environment. The Java VM is a self contained operating environment that behaves as if it is a separate computer (separate from the client computer system). Java applets run in a Java Virtual Machine that has no access to the host operating system. The independence of the Java VM from the client operating system ensures that the Java application will operate the same in any Java VM regardless of the client's operating system or hardware. Because programs running in the Java VM do not access the host operating system, there is less likelihood of rogue Java programs damaging other files or programs stored on the client computer system.

Figure 2:
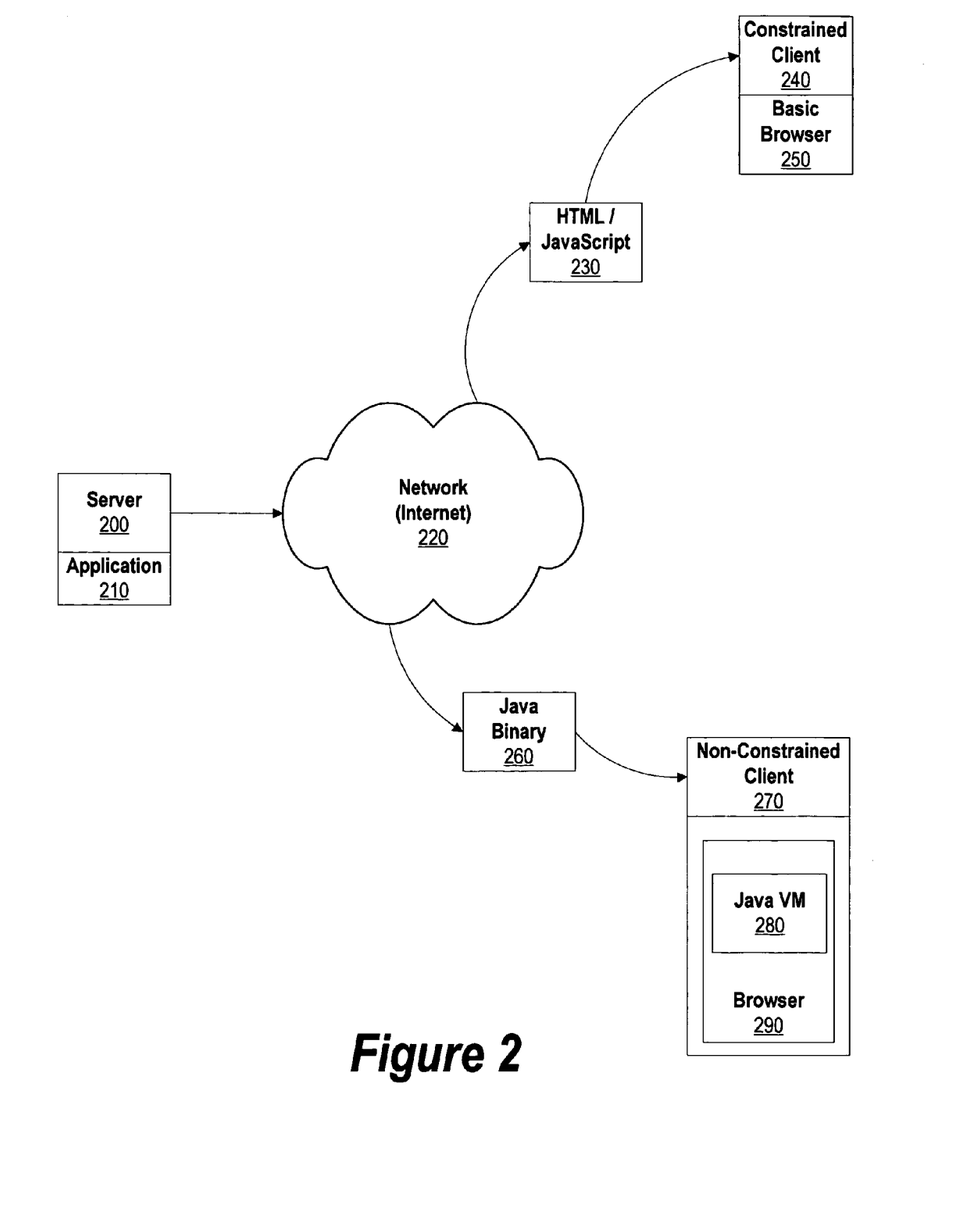
FIG. 2 is a block diagram of data being delivered over a computer network to both a constrained and non-constrained device.

FIG. 2 shows server 200 delivering display data to client computers over computer network 220. Server 200 includes application 210 that has been requested by both constrained client 240 and non-constrained client 270. Constrained client is using a pervasive computing device that, for one reason or another, does not run a Java Virtual Machine. Constrained client 240 may include hardware that is too slow or otherwise limited to run a Java Virtual Machine. Another reason constrained client 240 may be constrained is that its network connection may be too slow, for example a slow wireless connection, to adequately load Java applets. Constrained client 240 includes basic browser 250. Basic browser 250 is capable of browsing web pages but is unable to execute Java applets. Server 200 has determined that constrained client 240 is not running a Java Virtual Machine and therefore has converted the graphics from application 210 into HTML and/or JavaScript 230. HTML and/or JavaScript 230 is able to be displayed on basic browser 250 running within constrained client 240.

Server 200 has also determined that non-constrained client 270 is running Java Virtual Machine 280 within browser 290. Because non-constrained client is running a Java Virtual Machine, server 200 sends Java binary 260 to non-constrained client 270. Java Virtual Machine 280 is able to execute Java binary 260 and display the resulting output to the user of non-constrained client 270 in browser 290.

Figure 3:
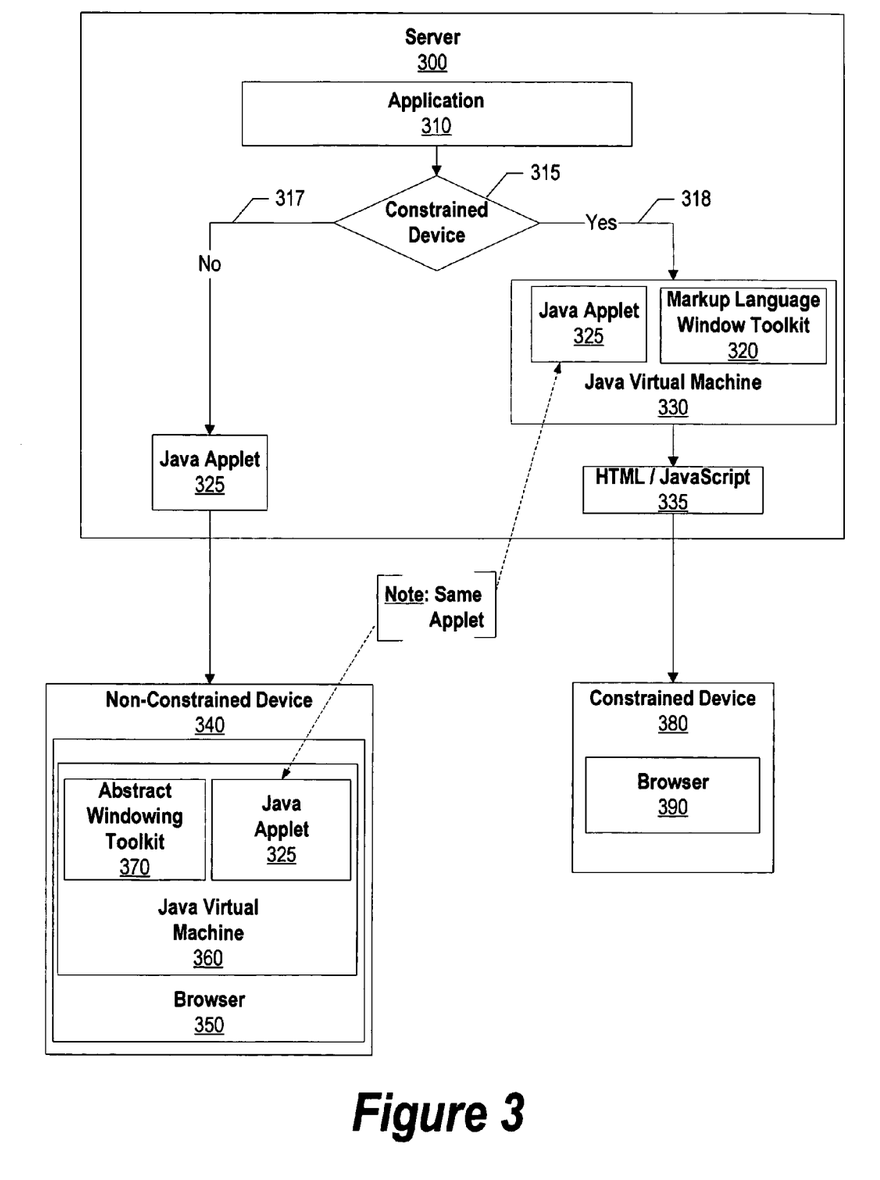
FIG. 3 is a block diagram of functional components occurring within a server, a non-constrained device, and a constrained device.

FIG. 3 shows server 300 providing application 310 to non-constrained device 340 and constrained device 380. Server determines whether the client is a constrained device (decision 315). If the client is a constrained device, "yes"

branch 318 is taken. To provide HTML/JavaScript to constrained device 380, server 300 executes Java Applet in Java Virtual Machine 330 running on server 300. Java Virtual Machine 300 uses Markup Language Window Toolkit 320 instead of the Abstract Window Toolkit (AWT) typically used by a Java Virtual Machine to render graphics. Markup Language Window Toolkit 320 includes the same application programming interfaces (APIs) that are included in the AWT. However, while the AWT APIs causes graphics to be displayed within a browser, Markup Language Window Toolkit 320 causes the creation of HTML/JavaScript 335 that is similar in appearance to the AWT graphics. HTML/JavaScript 335 is then sent to constrained device 380 and displayed with basic browser 390.

On the other hand, if server 300 determines that the client is running a Java Virtual Machine, decision 315 branches to "no" branch 317 whereupon Java applet 325 is sent to non-constrained device 340. Java applet 325 is executed by Java Virtual Machine 360 running within browser 350 on non-constrained device 340. To render graphics, Java applet 325 uses APIs within abstract windowing toolkit 370. Note that Java applet 325 is the same applet as was run by server 300 within Java Virtual Machine 330. In non-constrained device 340 abstract windowing toolkit 370 is used to render graphics, while in server 300 Markup Language Window Toolkit 320 is used to render HTML/JavaScript that can be rendered in a basic browser.

Figure 4:
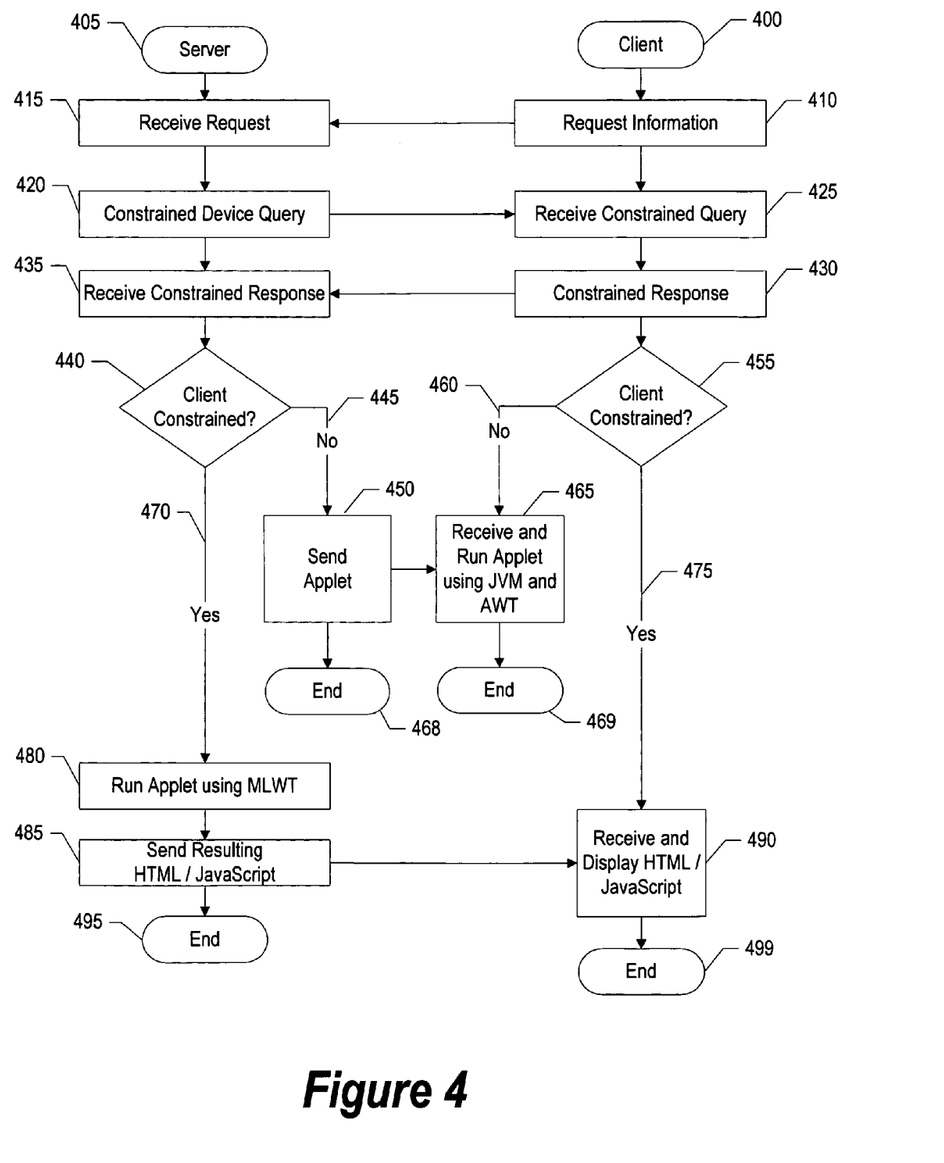
FIG. 4 is a flowchart of a server delivering information to a client.

FIG. 4 shows a flowchart depicting the interaction between client 400 and server 405 to provide graphic information to client 400. Client 400 sends a request for information to server 405 (step 410). Server 405 receives the request (step 415) and sends a message to client 400 to determine whether the client is constrained (step 420). Client 400 receives the constrained query (step 425) and sends a response (step 430) to server 405 indicating whether client 400 is constrained. The constraint response can be based upon a user selecting whether he or she wishes to receive and execute a Java applet. Client capabilities can also be determined by using the "User Agent" string automatically provided by browsers when making a request of a server computer. The User Agent string generally includes the name of the browser running on the client computer and its version level, the type of operating system being used by the client device, and may include additional information, such as whether the client device is AWT capable. In addition, a performance metric can be used to determine the throughput between the client and server computers through the network. If a slow throughput is detected, the client computer can be identified as constrained, while a higher throughput can cause the client to be identified as non-constrained. Furthermore, various combinations of these performance tests and inquiries can be made to determine constrained response 430.

Server 405 receives the constrained response from the client (step 435). If the client is not constrained, decision 440 branches to "no" branch 445 whereupon the applet is sent to the client as Java binary code (step 450) before server processing ends at termination 468. Correspondingly, if client computer determines that it is not constrained, decision 455 branches to "no" branch 460 whereupon the Java applet is received from the server and executed using the client's Java Virtual Machine using the abstract window toolkit located on client's computer (step 465) before client processing ends at termination 468.

On the other hand, the client computer may be constrained. In this case, decision 440 branches to "yes" branch 470 whereupon the applet is executed in the server's Java Virtual Machine using the Markup Language Window Toolkit (step 480). The result of the applet being executed in the server's Java Virtual Machine using the Markup Language Window Toolkit is HTML and/or JavaScript code that can be processed by client computer without use of a Java Virtual Machine. This resulting HTML and/or JavaScript code is sent to the client computer in step 485 before server processing ends at termination 495. The client receives the HTML and/or JavaScript code at step 490 and renders the code in the client's browser without use of a Java Virtual Machine. At this point, client processing ends at termination 499.

Figure 5:
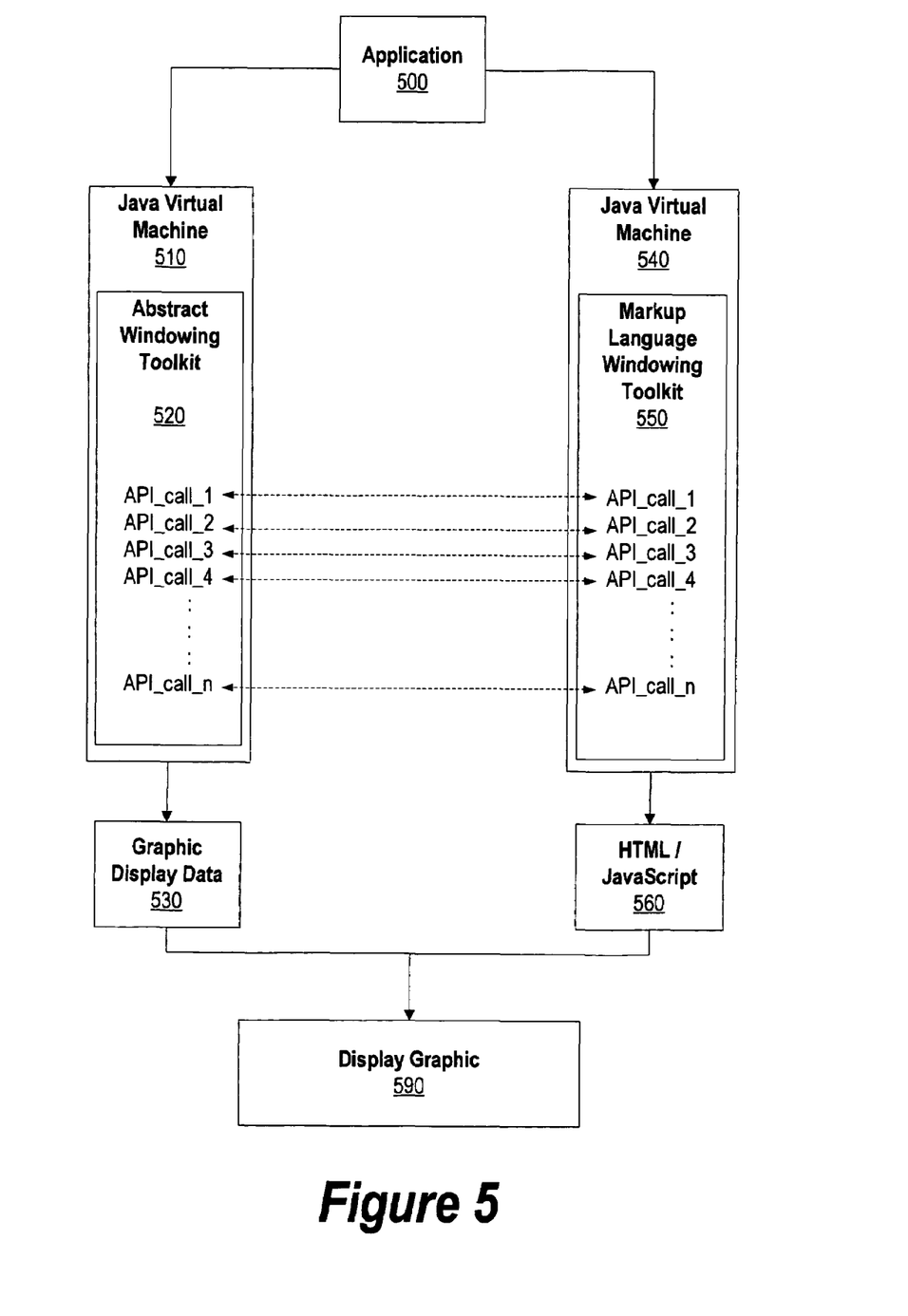
FIG. 5 is a block diagram the relationship between the Abstract Windowing Toolkit and the Markup Language Windowing Toolkit.

FIG. 5 shows application 500 being processed using two different windowing toolkits—Abstract Window Toolkit 520 and Markup Language Window Toolkit 550. The same application, for example a Java applet, is sent to Java Virtual Machine 510 and Java Virtual Machine 540. The Java Virtual Machines 510 and 540 may be the same Java Virtual Machine or may be different depending upon the operating system and hardware being used by the computer systems processing application 500. Java Virtual Machine 510 processes application 500 within a browser using Abstract Windowing Toolkit 520 creating graphic display data 530 that is displayed on the browser as display graphic 590. Accordingly, Java Virtual Machine 540 processes application 500 within a browser using Markup Language Window Toolkit 540 producing HTML/JavaScript 560. HTML/JavaScript 560 are in turn processed by the browser rendering display graphic 560. The net result of using Abstract Windowing Toolkit 520 on one hand, and Markup Language Window Toolkit on the other hand, is display graphic 590.

Both Abstract Windowing Toolkit 520 and Markup Language Window Toolkit 550 include multiple APIs for producing various graphics. Ideally, each API included in Abstract Windowing Toolkit 520 is included in Markup Language Window Toolkit 550. For example, an API to create a command button is included in both Abstract Windowing Toolkit 520 and Markup Language Window Toolkit 550. When Abstract Windowing Toolkit 520 is being used by the Java Virtual Machine, a command button appears on the browser screen when the API is used. Similarly, when Markup Language Window Toolkit 550 is used by the Java Virtual Machine, an API with the same name (i.e., CreateCommandButton( )) creates HTML or JavaScript code that will render a command button when processed by the browser.

Figure 6:
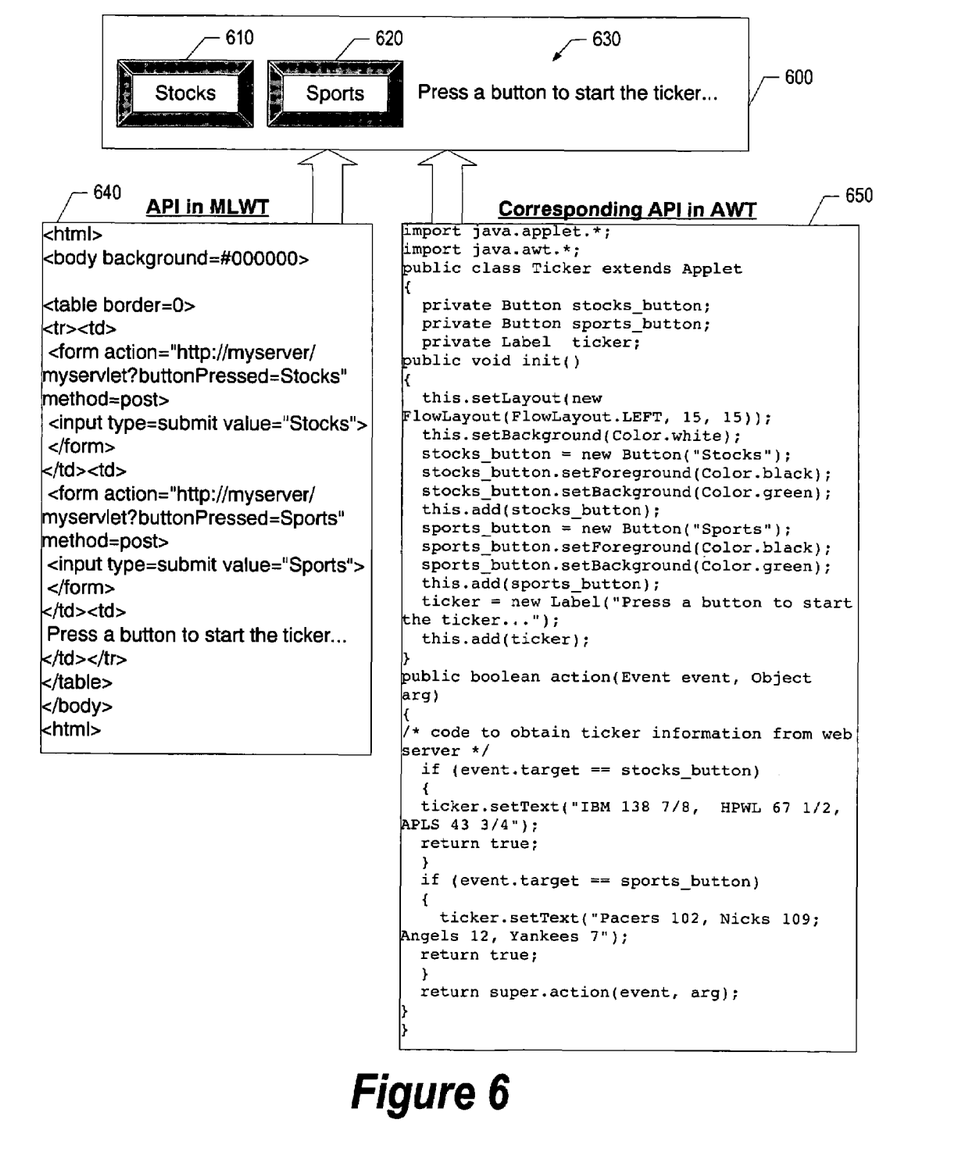
FIG. 6 is a diagram showing API code from both the Markup Language Windowing Toolkit and the Abstract Windowing Toolkit used to create sample display output.

FIG. 6 shows sample display 600, which includes two command buttons (610 and 620) and display text 630. When using the Markup Language Windowing Toolkit (MLWT) to create display 600 on a constrained device, MLWT API 640 is used. MLWT API 640 is written using HTML code. However, if display 600 is to be rendered on a non-constrained device, AWT API 650 is used. AWT API 650 would be compiled and run with the full AWT located on the client's computing device. AWT API 650 is written using the Java programming language. Both MLWT API 640 and AWT API 650 would have the same name (i.e., Ticker( )). MLWT API 640 would be included in the Markup Language Windowing Toolkit stored on the server. When the applet stored on the server called the Ticker( ) API to send HTML to a constrained client computing device, the Markup Language Windowing Toolkit version (MLWT API 640) would be used instead of the Abstract Windowing Toolkit version (AWT API 650). On the other hand, if the applet was sent by the server to a non-constrained client computing device, the Abstract Windowing Toolkit version (AWT API) would be used instead of the Markup Language Windowing Toolkit version 650 (MLWT API 640) to render display 600 on the client computing device.

Figure 7:
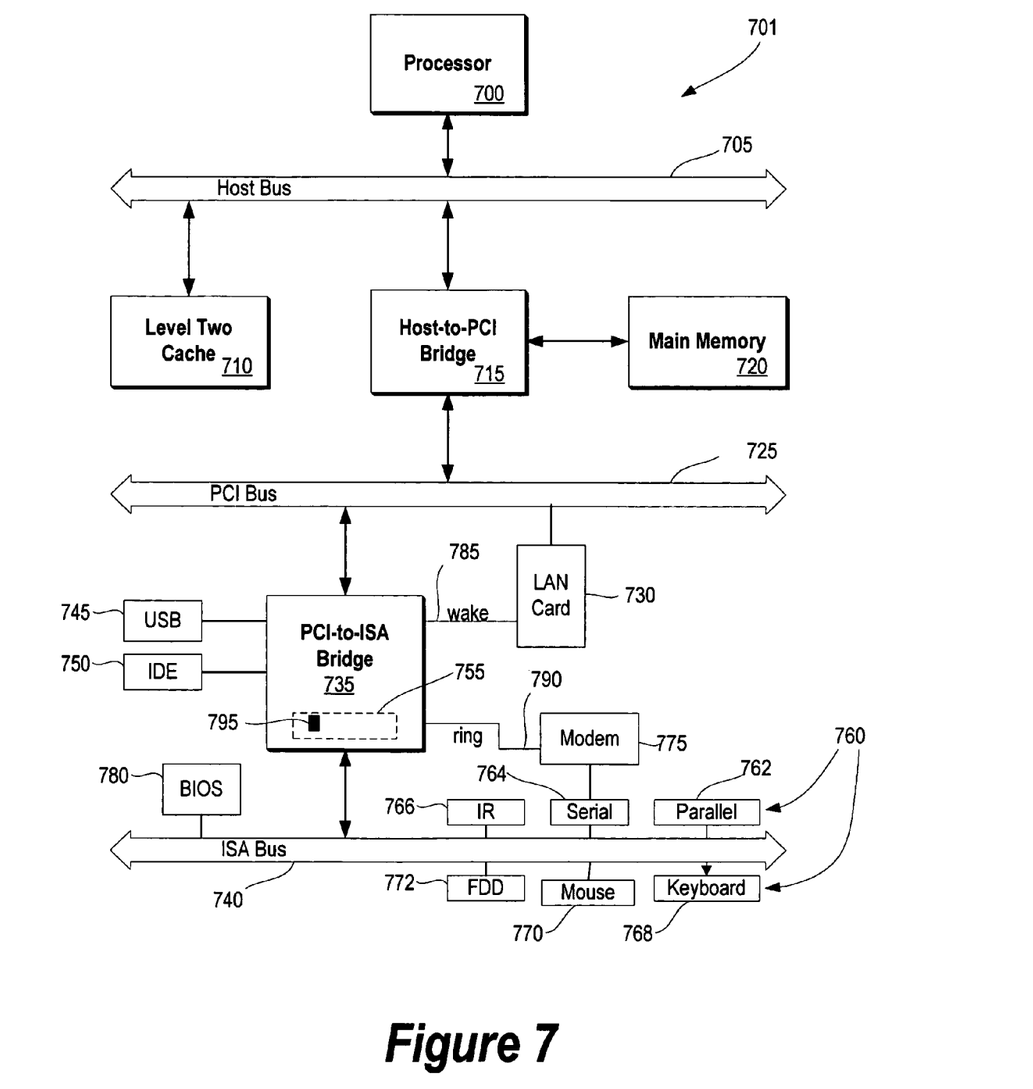
FIG. 7 is a block diagram of an information handling system capable of implementing the present invention.

FIG. 7 illustrates information handling system 701 which is a simplified example of a computer system capable of performing the present invention. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (FDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 another computer system to copy files over a network, LAN card 730 is coupled to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the copying processes described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for executing an application containing executable code that calls one or more named APIs, wherein each of the named APIs corresponds with both an API from a markup language window toolkit and an API from an abstract window toolkit, said method comprising:
   determining whether a client computing device is constrained;
   in response to determining that the client computing device is constrained;
      processing the application, the processing resulting in a scripted representation, wherein said processing of the application includes calling the API from the markup language window toolkit; and
      sending the scripted representation to the client computing device; and
   in response to determining that the client computing device is not constrained:
      sending the application to the client computing device, such that when the application is executed at the client computing device, the execution includes calling the API from the abstract window toolkit.

2. The method as described in claim 1 wherein the application is an applet.

3. The method as described in claim 1 wherein the scripted representation includes Javascript code.

4. The method as described in claim 1 wherein the scripted representation includes HTML code.

5. The method as described in claim 1 wherein the processing further comprises:
   executing the application in a second application, wherein the second application calls the API from the markup language window toolkit.

6. The method as described in claim 1 further comprising:
   receiving the scripted representation at the client computing device;
   processing the scripted representation by a browser application running within the client computing device; and
   displaying one or more graphics on a display connected to the client computing device, the displaying resulting from the processing.

7. The method as described in claim 1 further comprising:
   receiving the application at the non-constrained client computing device;
   executing the application using a virtual machine running within a browser invoked on the client computing device; and displaying one or more graphics on a display connected to the client computing device in response to the executing.

8. The method as described in claim 1 wherein the determining further comprises:
calculating a transmission throughput from the sending computer to the client computing device resulting in a transmission throughput amount; and
determining whether the client computing device is constrained based upon the transmission throughput amount.

9. The method as described in claim 1 wherein the determining further comprises:
receiving a signal from the client computing device, the signal indicating whether the client computing device is constrained.

10. The method as described in claim 1 further comprising:
accessing a computer network,
wherein the sending the scripted representation further includes transmitting the scripted representation over the computer network.

11. An information handling system comprising:
one or more processors;
a memory accessible by the processors;
a nonvolatile storage device accessible by the processors;
an application stored on the nonvolatile storage device; and
an application delivery tool, the application delivery tool including:
means for determining whether a client computing device is constrained;
means for processing the application for the client computing device in response to determining that the client computing device is constrained, the processing further including:
means for creating a scripted representation of the application, wherein said means for creating includes calling an API from a markup language window toolkit stored on the nonvolatile storage device; and
means for sending the scripted representation to the client computing device; and
means for delivering the application to the client computing device in response to determining that the client computing device is not constrained, such that when the application is executed at the client computing device, the execution includes calling an API from an abstract window toolkit.

12. The information handling system as described in claim 11 wherein the scripted representation includes HTML code.

13. The information handling system as described in claim 11 wherein the scripted representation includes JavaScript code.

14. The information handling system as described in claim 11 wherein the application is an applet.

15. A computer program product for executing an application containing executable code that calls one or more named APIs, wherein each of the named APIs corresponds with both an API from a markup language window toolkit and an API from an abstract window toolkit, said computer program product comprising:
means for determining whether a client computing device is constrained;
means, responsive to a determination that the client computing device is constrained, for processing the application, the processing resulting in a scripted representation, wherein said means for processing the application includes calling the API from the markup language window toolkit;
means, responsive to a determination that the client computing device is constrained, for sending the scripted representation to the client computing device; and
means, responsive to a determination that the client computing device is not constrained, for sending the application to the client computing device, such that when the application is executed at the client computing device, the execution includes calling the API from the abstract window toolkit.

16. The computer program product as described in claim 15 wherein the application is an applet.

17. The computer program product as described in claim 15 wherein the scripted representation includes Javascript code.

18. The computer program product as described in claim 15 wherein the scripted representation includes HTML code.

19. The computer program product as described in claim 15 wherein the means for processing further comprises:
means for executing the application in a second application, wherein the second application calls the API from the markup language window toolkit.

20. The computer program product as described in claim 15 further comprising:
means for receiving the scripted representation at the client computing device;
means for processing the scripted representation by a browser application running within the client computing device; and
means for displaying one or more graphics on a display connected to the client computing device, the displaying resulting from the processing.

21. The computer program product as described in claim 15 further comprising:
means for receiving the application at the non-constrained client computing device;
means for executing the application using a virtual machine running within a browser invoked on the client computing device; and
means for displaying one or more graphics on a display connected to the client computing device in response to the executing.

22. The computer program product as described in claim 15 wherein the means for determining further comprises:
means for calculating a transmission throughput from the sending computer to the client computing device resulting in a transmission throughput amount; and
means for determining whether the client computing device is constrained based upon the transmission throughput amount.

23. The computer program product as described in claim 15 wherein the means for determining further comprises:
means for receiving a signal from the client computing device, the signal indicating whether the client computing device is constrained.

24. The computer program product as described in claim 15 further comprising:
means for accessing a computer network,
wherein the means for sending the scripted representation further includes means for transmitting the scripted representation over the computer network.

* * * * *

UNITED STATES PATENT AND TRADEMARK OFFICE
CERTIFICATE OF CORRECTION

PATENT NO. : 6,976,059 B1
DATED : December 13, 2005
INVENTOR(S) : Rogalski et al.

It is certified that error appears in the above-identified patent and that said Letters Patent is hereby corrected as shown below:

Column 8,
Line 30, delete "constrained;" and insert -- constrained: --.

Signed and Sealed this

Ninth Day of May, 2006

JON W. DUDAS
*Director of the United States Patent and Trademark Office*